United States Patent [19]

Kosikowski et al.

[11] Patent Number: 5,098,721
[45] Date of Patent: Mar. 24, 1992

[54] STARTER COMPOSITIONS FOR PRODUCING FERMENTED MILK PRODUCTS

[75] Inventors: Frank V. Kosikowski, Brooktondale; Vikram V. Mistry, Ithaca, both of N.Y.

[73] Assignee: Cornell Research Foundation, Inc., Ithaca, N.Y.

[21] Appl. No.: 573,381

[22] Filed: Aug. 24, 1990

Related U.S. Application Data

[63] Continuation of Ser. No. 711,519, Mar. 13, 1985, abandoned.

[51] Int. Cl.$^5$ .................................................. A23C 9/12
[52] U.S. Cl. ........................................ 426/61; 426/42; 426/43; 426/40
[58] Field of Search ................. 426/34, 36, 41, 42, 426/43, 61, 491, 582, 583, 588

[56] References Cited

U.S. PATENT DOCUMENTS

| | | | |
|---|---|---|---|
| 4,244,971 | 1/1981 | Wargel et al. | 426/42 |
| 4,341,801 | 7/1982 | Weissman | 426/41 |
| 4,372,979 | 2/1983 | Reinbold et al. | 426/42 |
| 4,401,679 | 8/1983 | Rubin | 426/36 |
| 4,515,815 | 5/1985 | Kosikowski | 426/40 |
| 4,518,616 | 5/1985 | Czulak | 426/42 |

*Primary Examiner*—Marianne Cintins
*Attorney, Agent, or Firm*—Ralph R. Barnard

[57] ABSTRACT

A fermentation starter composition for fermented milk products such as cheese, buttermilk, sour cream and yogurt, formed from an inherently buffered, concentrated milk protein concentrate which is a retentate formed by ultrafiltering milk and a milk fermenting, acid production causing bacteria. The compositions maintain a predetermined pH range for a substantial time period due to the inherent buffering capacity for the composition. The starters are useful in making fermented products.

13 Claims, 1 Drawing Sheet

STARTER COMPOSITIONS FOR PRODUCING FERMENTED MILK PRODUCTS

This is a continuation of application Ser. No. 06/711,516, filed Mar. 13, 1985; now abandoned.

Dairy product starters are cultures of harmless, active bacteria, grown in milk or whey and which impart certain characteristics and qualities to various milk products such as cheese, buttermilk, sour cream and yoghurt.

Cultures and starters for fermented milk products are discussed in Chapter 3, pages 16-36 of a book entitled "Cheese and Fermented Milk Foods", 2nd Ed. with revisions, 1978, authored by Frank Kosikowski and published by F. V. Kosikowski and Associates, P. O. Box 139, Brooktondale, N.Y. 14817. As stated in this book, there are many distinct types of starter cultures for milk fermentations. Several different types of bacteria are often used simultaneously in a starter culture because the various strains and species often perform in a symbiotic relationship, and at other times different species of culture operate in an antagonistic relationship. A mother culture is a small volume of inoculated growth medium, for example cultured milk or whey which is periodically transferred, usually daily, into a plurality of growth medium containers with the best resulting cultures selected for making a larger volume of starter, e.g. a bulk starter. The mother starter is synonymous with certified seed. Bulk starter, i.e. the starter used for product inoculation, can be made from the mother starter and is used for inoculation of the milk product as a part of the production fermentation step. The mother or bulk starters can be stored in several forms. One form is a dry state or powder, another form is frozen and the frozen product which can be in the concentrated form. The maintenance or survival of starter cultures both of the mother and bulk type is a major activity in the dairy industry at all levels of participation. Starters are typically adversely affected by a PH below 5.0. Also bacteriophage and antibiotics in the milk starter are detrimental to the maintenance or survival of starter cultures. To date, starter cultures of the bulk starter type usually have been made from whole milk, skim milk, and whey.

A concern evolving from the acidity of bacteria growth in standard starters which causes lowering the pH of the starter below about 5.0 has been the subject of several prior art techniques. In one example, in a whey starter system for making cheese and other fermented dairy foods, ammonia ($NH_3$) was introduced into the whey in an amount necessary to establish a pH of about 5.5 during growth of culture in the milk starter over a fixed period. The amount of $NH_3$ added was monitored over the culture growing period. The purpose was to maintain large numbers of active starter organisms by controlling the pH. Afterwards, the starter is added to cheesemilk. Another approach has been to add phosphate salts to bulk starter powder or concentrate including whey protein concentrate to maintain a steady pH 5.3-5.8 environment during the growth of the lactic acid organisms. A high concentration of added phosphate salts is injurious to lactic acid bacterial growth.

The use of ultrafiltration in the milk industry for cheese making is well known. As employed in the milk industry, ultrafiltration is accomplished by the use of a ultrafiltration membrane which prevents the passage of milk proteins but allows the passage of lactose. The use of ultrafiltration in cheese making is discussed in Chapter 28, pages 510-516 of Kosikowski, supra.

The application of ultrafiltration to concentration of milk in various aspects of cheese making is further described in the prior art, including French Patents 2,052,121 and 2,289,115, U.S. Pat. Nos. 3,914,435, 3,963,837 and 4,205,090; Maubois, et al., *Journal of Dairy Science*, 61:881-884 and Balducci, *Illate*, January 1974, pp. 471-473.

However, none of the teachings of the prior art have suggested using the concentration of milk proteins and salts found in the retentate produced by the ultrafiltration of milk to create an inoculated product, which when used as a starter for bacterial fermentation of milk products, buffers the pH of the composition so that a culture, e.g. lactic acid culture, maintains a high level of bacterial numbers. When such a starter is added to milk and related products to be fermented, a high efficiency of conversion to the final product is attained. The bacteria then maintain themselves optimumly at a pH above 5.0. In the absence of the strong buffer provided by the retentate in the starter with concentration of milk proteins and salts, the acid created by the growth of the bacteria would progressively drive the pH down thereby inhibiting the growth and numbers of culture organisms in the starter.

The buffering capacity of milk and skim milk retentates was known at the time of the present invention. It was known to use retentates of various concentrations as cheese milk in the cheesemaking process. Moreover, using a retentate cheese milk in combination with standard bulk starters gave rise to special considerations in the cheese making process because of the buffering action of the retentate when used as a cheese milk. Publications illustrating this fact are: *Buffer, Lactic Fermentation, and Rennet Coagulation Properties of Skim Milk Retentates Produced by Ultrafiltration* H. R. Covacevich and F. V. Kosikowski, 1979 J. Dairy Sci. 62(2):204; and *Etude de la teneur en elements mineraux des produits obtenus lors de l'ultrafiltration du lait sur membrane* G. Brule, J. L. Maubois and J. Faquant, 1974 Le Lait 54(539-540):600. By way of distinction the present invention benefits from the pH buffering resulting from the high concentration of proteins and insoluble salts in the retentate of ultrafiltrated milk, which heretofore has been a concern when the retentate is used as cheese milk. Specifically, the same buffering mechanism is used to advantage to make a very well buffered starter for milk fermentation wherein buffering of the starter medium (made of retentate) maintains a pH range of approximately 5.0 up to 6.0, providing an optimum environment for the growth and maintenance of fermentation organisms, for example lactic acid bacteria. That starter can then be used in a dairy product fermentation step to good advantage, because the bacterial count is high, the protein concentration is high, and the proportions with which the starter may be added to the milk may be increased as desired to increase yields without the concern of a shift in the pH of the fermenting product by reason of acid development.

DESCRIPTION OF THE INVENTION

Figure 1:
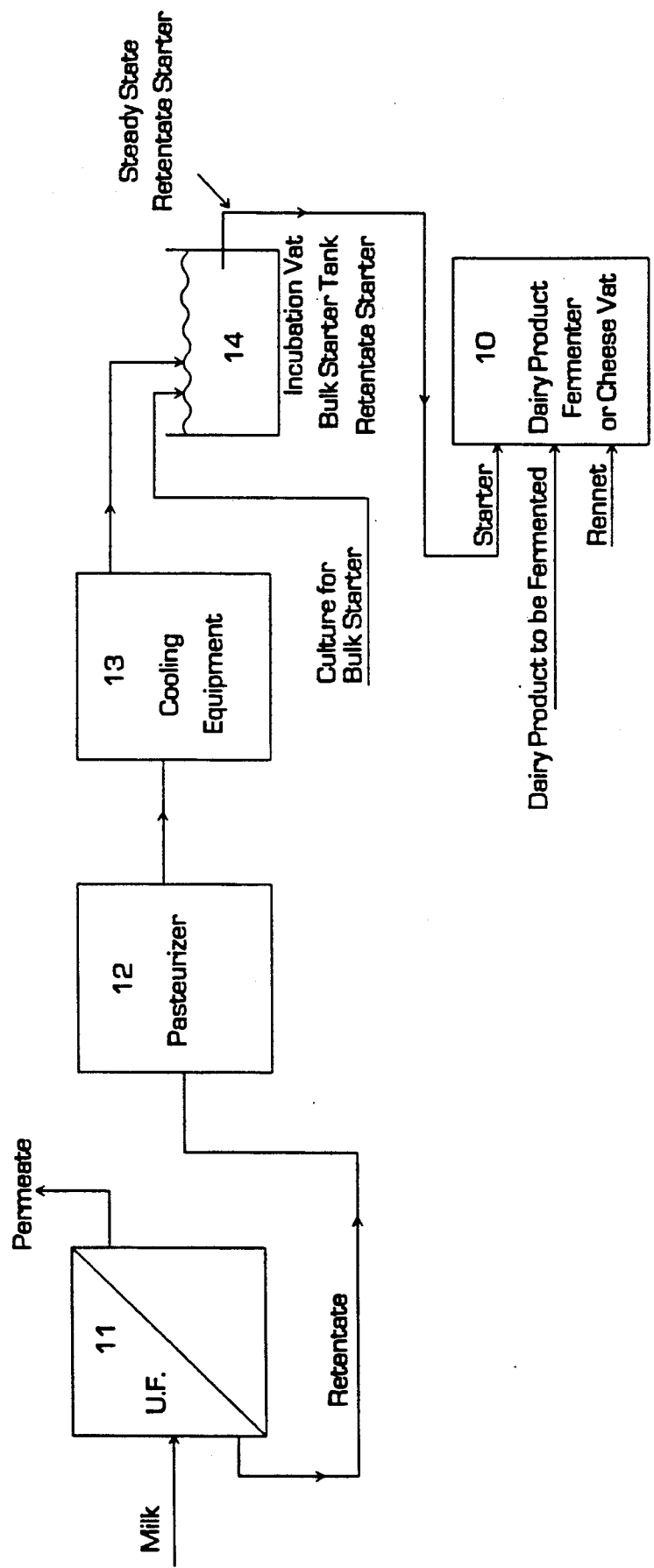
FIG. 1 is a schematic flow chart of an embodiment of a process of the invention.

This invention relates to starter compositions for producing fermented milk products, to methods for producing such starter compositions, and to methods for employing such starter compositions in making fermented milk products, for example cheese, buttermilk, sour cream and yoghurt.

The starter compositions of the invention comprise a concentrated, inherently buffered, milk protein composition which has a milk protein concentration of at least about 2:1 and preferably between about 3:1 and about 10:1 as compared to the milk protein content of milk or skim milk, prepared by ultrafiltering milk or skim milk, and containing sufficient active milk fermenting acid creation causing bacteria to milk.

The starter compositions of the invention are inherently buffered because of the proteins and salts contained in the composition and can be adapted through the degree of concentration, and, if desired, through the use of added buffering agents or the like to maintain a predetermined pH range favorable to the growth and maintenance of the particular acid creation causing, milk fermenting bacteria employed in the composition. The compositions maintain said predetermined pH range for a substantial time period due to the inherent buffering capacity of the composition.

The useful bacteria include bacteria listed by Kosikowski, supra, at page 16, for example *Streptoccus lactis, S. diacetilactis, S. cremoris, Leuconostoc citrovorum,* and *L. dextranicum,* and can be employed as single or mixed strains. The concentrated protein composition and the bacteria are combined at a temperature suitable to the particular bacteria employed.

As is well known in the art the retentate is formulated with the bacteria under sterile or pasteurized conditions to avoid the presence of undesirable bacteria and the like.

If desired, the composition of the invention can be processed to form a dry powder, i.e. lyophilized composition, or a frozen composition for example to facilitate storage or transportation.

A starter, including a bulk starter, for fermented dairy products such as cheese, buttermilk, sour cream or yoghurt as taught by the present invention may be made using the following steps:

(a) passing milk through milk ultrafiltration equipment until a retentate is produced at a level of protein concentration, such that when selected milk fermenting bacteria are added thereto the pH of the retentate will be stabilized at a level such that the bacterial growth will be actively maintained.

(b) Pasteurizing said retentate so produced.

(c) Cooling said retentate to a temperature optimum for growing the selected milk fermenting bacteria.

(d) Adding a sufficient amount of the selected milk fermenting bacteria to provide a composition wherein bacterial growth will be enhanced because of pH stabilization due to the buffering capacity of said retentate.

Because the starter is established at an optimum pH level for the maximum survival and maintenance of the selected milk fermenting bacteria (in many but not all cases a pH in the range of 5.0-6.0). During the fermentation process which occurs in the starter composition a natural uncoagulated milk starter is obtained which has a high number of desired bacterial organisms. Typically neither ammonia ($NH_3$) nor added phosphate salts are required in the formulation of the starter for the maintenance of the proper pH while the bacteria are multiplying.

For much cheese making using standard bulk starters, a milk acid ripening period of 30–60 minutes is required to develop the pH conditions for subsequent optimum rennet activity. Added buffering agents such as ammonia or phosphates have as their major function the setting of the proper pH environment for the optimum maintenance of milk fermenting bacterial numbers. Retentate-based starter of the invention accomplishes this function naturally without additives, and introduces other advantages to cheese and fermented milk food manufacture. In accordance with the teachings of the present invention, the retentate-based starter when added to milk or milk products does not require a milk acid ripening or waiting period or at least requires a shorter period because it establishes a pH which permits the optimal rennet coagulation of the milk product.

The new retentate-based starter, made in accordance with the teachings of the present invention, has been characterized by the inventors herein as a steady state retentate starter and also as a steady state retentate starter system (SSRSS). The retentate-based starter, made in accordance with the teachings of the present invention, may be added to the cheesemilk or other milk-based beginning composition over a rather wide range of proportions by volume, for example 10 percent. It is extremely high in active milk fermenting organisms and the optimum pH is maintained by the high concentration of milk protein and insoluble salts. The combination of conditions results in improved efficiencies in the milk fermentation process. For example, in cheesemaking an addition of retentate-based starter made in accordance with the teachings of the present invention not only contains high numbers of milk fermenting bacteria, but sufficiently high protein levels such that the amount of cheese made will increase. Also, the quality of the final fermented milk product, such as cheese, would improve with increased protein in the fermented milk produced if the original starting milk based material were of marginal quality.

When adding a retentate-based starter made in accordance with the teachings of the present invention to a milk product such as cheesemilk for fermentation, and such cheesemilk is in itself, wholly or partly, a retentate product of ultrafiltration, a pre-fermentation ultrafiltration step may be carried out during the formulation of the starter containing pre-cheese at about 28-30 degrees centigrade to obtain a pH of about 5.5. This additional alternate step shortens the overall time required for the production of the fermented milk product such as cheese. However, this optional technique or step should be accomplished with care in order to prevent coagulation of the milk product in the membranes of the ultrafiltration equipment. Such coagulation may be prevented by selecting an appointed time before coagulation commences for raising the temperature of the milk product being concentrated in the ultrafiltration equipment. An abrupt raising of the temperature of the milk product to a range of 52-54 degrees centigrade will arrest bacterial growth. The short growth period of bacteria during the ultrafiltration process for the cheesemilk would not allow the bacteria to grow to very large numbers associated with the retentate-based starter compositions made in accordance with the teachings of the present invention.

Some milk fermenting bacteria are classified as mesophilic, meaning that they will grow well at moderate temperatures in a range of 20° C. to approximately 37° C. Other milk fermenting bacteria are classified as thermophilic, meaning that they will grow well at higher temperatures in a range of approximately 37° C. and higher. When practicing the teachings of the present invention, the protein concentration of the milk retentate used to make the starter may be varied over a range. Thermophilic lactic acid bacteria produce more acid and are tolerant to higher acid levels than mesophilic lactic acid bacteria. Therefore, the thermophilic bacteria requires a higher buffer capacity retentate. Higher retentate concentration will provide higher buffer capacity. The teachings of the present invention may be used in the same manner to make both mother starters and bulk starters.

The teachings of the present invention may be better understood by a description of the process flow illustrated in FIG. 1. The object of the process described is to produce a bulk starter which may be added to a dairy product production fermenter, i.e. cheese vat (Block 10), along with the milk product to be fermented. The bulk starter may be either liquid, semi-solid, powder or a frozen type. In any event, it is applied to the dairy product to be fermented in a conventional way. The teachings of the present invention apply to making a bulk starter which will react with the dairy product (and rennet action if present) in the fermenter or cheese vat. A speical quality of the bulk starter, made in accordance with the teachings of the present invention, is that it has a buffered pH level so that its pH has not been greatly modified by the growth level of the selected milk fermenting bacteria, nor has the bacterial count reached a point where it is not maintainable because the pH has become acid beyond the range suited for the bacteria which provides the desired activity in the fermenter or cheese vat.

The concentrated retentate from which the starter is made contains more protein bound calcium and phosphorous to naturally buffer the medium to permit the maximum number of bacteria organisms to grow and be maintained. Moreover, the usual milk acid ripening or waiting period is not required or is shortened because the starter compositions of the invention lower the pH of the cheese milk to that which is conducive to lactic acid bacterial growth, and rennet curd formation, thereby shortening the cheesemaking time.

The improved starter, in accordance with the present invention, is improved because it is made from retentate obtained from the outputs of ultrafiltration equipment which is shown in Block 11 as conventional milk ultrafiltration equipment. The ultrafiltration equipment used by the inventors was an Abcor 22S ultrafiltration unit equipped with tubular membranes of 20,000 daltons molecular weight cut-off. In any event, as is well known to those skilled in the art, the milk passing through the ultrafiltration separates into two components. The retentate contains largr soluble components of milk along with the insoluble components of milk, including fats. Whereas the permeate contains water and smaller soluble components of milk, like lactose and certain salts. The ultrafiltration operation lasts until the milk protein reaches a selected concentration to give a retentate. The exact concentration level is a matter of choice depending on the particular type of bacteria starter to be made. For example, when some types of mesophilic bacteria are being used, a 4 to 1 concentration may well be appropriate. Thereafter the retentate is pasteurized using conventional techniques. Block 12 shows such a pasteurizer. The pasteurized retentate is then passed on to conventional cooling equipment shown by Block 13 where the retentate may be cooled to a temperature for growing the selected bacteria being used. After the retentate is cooled it is passed to a conventional incubation vat for a bulk starter (shown by Block 14) where it is innoculated with the selected culture or cultures of bacteria, and a steady state bulk retentate starter is grown which maintains a pH in an approximate range and optimizes both the numbers and maintenance of the bacteria as a bulk starter, which ultimately may be stored (prior to use) as a frozen concentrate, a liquid, or as a dry powder. In accordance with the teachings of the present invention the bulk retentate starter has a high bacterial count and when added to the dairy product in the production fermenter will produce fermentation and maintain or buffer the dairy product in the fermenter at the optimum pH level. The incubation vat for the retentate starter can take many conventional forms without departing from the teachings of the present invention. Thus, a starter made from the retentate of ultrafiltrated milk (to appropriately selected concentrations) will contain sufficient protein bound calcium and phosphorous to naturally buffer that starter medium to permit the bacteria added thereto to grow and be maintained for a substantial period without driving the pH of the starter medium to a point of acidity which limits the growth and maintenance of the bacteria.

In one example whole milk was ultrafiltered at 54° C. in an ultrafiltration unit to a retentate of approximately 4:1 protein concentration and then heated to 85° C. for 30 minutes in a pasteurizing unit and cooled to 22° C. in cooling equipment. The retentate was innoculated with a commercial frozen concentrated mesophilic lactic starter (streptococcus lactis) to give approximately $10^7$ cfu/ml (colony forming units per milliliter), and incubated at 22° C. for 12 hours. A commercial phage inhibitory media (PIM) and 11% non fat dry milk (NFDM) media were used as controls. The experiment was conducted three times and with two different frozen concentrated starters (streptococcus lactis and streptococcus cremoris). After 12 hours at 22° C. the retentate media had a statistically significiantly greater cfu/ml ($3.2 \times 10^9$), and pH (5.21) than NFDM ($2.4 \times 10^9$ and pH 4.58), and PIM ($2.5 \times 10^9$ and pH 5.02). This shows that a retentate medium can support greater bacterial numbers over a longer period because of it was buffered at high pH compared to the controls (NFDM and PIM) which had lower pH's and bacterial numbers after 12 hours. When innoculated at 2% in 11% NFDM and incubated at 32° C. for 4 hours the retentate-based starter and PIM produced about equal acidity (.3%) compared to .26% by NFDM starter. A retentate-based starter, because of its high bacterial count, was more active than the NFDM and PIM controls. After a further 8 hours at 22° C. the retentate starter had the highest pH (4.95) compared to 4.76 in PIM and 4.51 in NFDM. At this time the acid producing capacity of retentate starter in 11% NFDM had remained unchanged (.3%) compared to .27% for PIM and .19% for NFDM. When a conventional starter like that grown in NFDM is held for 20 hours at 22° C., its pH drops down to below 4.6 and this in turn injures its bacterial cells weakening their activity. The retentate-based starter on the other hand maintains its pH fairly constant (approximately pH 5.0) because of its buffering capacity, thereby conserving its bacterial cell activity for long periods of time at 22° C.

While the teachings of the present invention have been described in producing a new and improved dairy product starter made from the retentate of the ultrafiltration of whole milk, the same teachings may be practiced using skim milk and the phrase dairy product as used herein to described the input of the ultrafiltration process is intended to include the use of skim milk and other dairy product as the source of the ultrafiltration retentate.

The above teachings could apply to other fermented foods and products wherein a retentate-based starter can be used as a starter for silage and fermented meats such as sausage, etc. A retentate-based starter used in accordance with this invention may be applied to any fermentation where milk fermenting bacteria are critical to the fermentation.

While in the foregoing description the detailed embodiments of the present invention have been set forth, it will be understood by those skilled in the art that considerable variation may be made in such detail without departing from the spirit of our invention.

We claim:

1. A fermentation starter composition comprising:
    (a) a total milk protein composition of said starter composition that is concentrated, inherently buffered and prepared by ultrafiltrating milk or skim milk such that said starter composition has a milk protein concentration of at least about 2:1 as compared to the milk protein content of the original starting milk or skim milk, and;
    (b) sufficient active milk fermenting, acid producing bacteria to cause fermentation of a milk product;
    (c) said starter composition maintaining a pH range favorable to the growth and maintenance of said milk fermenting bacteria for a substantial time period due to the inherent buffering capacity of said concentrated milk protein composition such that the starter composition has an active bacteria count significantly greater than $2.5 \times 10^9$ cfu/ml.

2. The fermentation starter composition of claim 1 wherein the ultrafiltration derived concentrated milk protein composition has been concentrated between about 3:1 and about 10:1, as compared to the milk protein content of milk or skim milk.

3. The fermentation starter composition of claim 1, where the bacteria comprises a lactic acid forming bacteria.

4. The fermentation starter composition of claim 1, wherein said composition maintains the pH of the composition in a pH range between about 5.0 and about 6.0.

5. The fermentation starter composition of claim 1 which is a dry powder.

6. The fermentation starter composition of claim 1 in frozen form.

7. A starter composition for preparing fermented dairy products made by the following method:
    a) passing milk or milk products through milk ultrafiltration equipment until a retentate that is entirely ultrafiltration derived, concentrated and inherently buffered is produced with a level of concentration of protein of at least about 2:1 and insoluble salts such that when selected lactic acid bacteria are added thereto the pH of the retentate will be stabilized at a level such that bacterial numbers greater than $2.5 \times 10^9$ cfu/ml will be actively maintained for a substantial time period;
    b) pasteurizing said retentate so produced;
    c) cooling said retentate to a temperature optimum for growing lactic acid bacteria;
    d) adding a sufficient amount of a lactic acid culture to said cooled and pasteurized retentate such that bacterial growth will be actively maintained for a substantial time period because of pH stabilization due to the buffering capacity of said retentate.

8. The starter of claim 7 wherein the selected lactic acid culture which is added is thermophilic.

9. The starter of claim 7 wherein the selected lactic acid culture which is added is mesophilic.

10. The starter as in claim 7 for fermented dairy products made by the following method:
    a) passing milk or milk products through milk ultrafiltration equipment until a retentate is produced concentrated in total protein to approximately 3:1-10:1;
    b) pasteurizing said retentate;
    c) cooling said retentate to a temperature optimum for growing lactic acid bacteria;
    d) adding sufficient lactic acid culture to said cooled and pasteurized retentate;
    e) holding said retentate until the bacterial numbers greater that $2.5 \times 10^9$ cfu/ml are obtained while the strong buffering of the said retentate functions to establish a pH between about 5 and about 6 where said bacterial numbers are maintained for a substantial time period.

11. A fermentation starter composition consisting of:
    (a) a total milk protein composition of said starter composition that is prepared by ultrafiltrating milk or skim milk such that said starter composition has a milk protein concentration of at least about 2:1 as compared to the milk protein content of the original starting milk or skim milk, and;
    (b) sufficient active milk fermenting, acid producing bacteria to cause fermentation of a milk product;
    (c) said starter composition maintaining a pH range favorable to the growth and maintenance of said milk fermenting bacteria for a substantial time period due to the inherent buffering capacity of said concentrated milk protein composition such that the starter composition has an active bacteria count significantly greater than $2.5 \times 10^9$ cfu/ml.

12. The fermentation starter composition of claim 11, wherein said composition maintains the pH of the composition in a pH range between about 5.0 and about 6.0.

13. An improved fermentation starter composition of the type in which sufficient active milk fermenting, acid producing bacteria are present to cause fermentation of a milk product and said starter composition has an active bacteria count significantly greater than $2.5 \times 10^9$ cfu/ml., and in which said starter composition maintains a pH range favorable to the growth and maintenance of said milk fermenting bacteria for a substantial time period due to an inherent buffering capacity of said starter composition, wherein the improvement comprises:
    a total milk protein composition of said starter composition that is prepared by ultrafiltrating milk or skim milk such that said starter composition has a milk protein concentration of at least about 2:1 as compared to the milk protein content of the original starting milk or skim milk.

* * * * *